United States Patent Office 3,046,309
Patented July 24, 1962

3,046,309
ALKYLATION OF AROMATIC COMPOUNDS
Thomas F. McGrath, Norwalk, Conn., assignor to American Cyanamid Company, New York, N.Y., a corporation of Maine
No Drawing. Filed May 4, 1959, Ser. No. 810,594
6 Claims. (Cl. 260—612)

The present invention relates to a novel method of alkylating aromatic compounds. More particularly, the instant discovery concerns the reaction of alkyl halides, substituted or unsubstituted, with aromatic hydrocarbons, substituted or unsubstituted, in the presence of organometallic compounds.

The present discovery differs materially from the known Grignard reaction in which, for example, an organomagnesium compound is reacted in the presence of diethyl ether with an aralkyl halide, such as benzyl chloride. In the normal Grignard reaction the organo-moiety of the organometallic component combines with the benzyl moiety, so to speak, of the aralkyl halide component according to the following equation:

$$RMgX + R'Cl \rightarrow RR' + MgXCl$$

Pursuant to the instant invention, however, it has been discovered that aromatic compounds may be alkylated: by (a) bringing together a member of the group consisting of aralkyl halides and alkyl halides, said halides having a relatively polar carbon-halogen bond; and (b) an aromatic hydrocarbon, mononuclear or polynuclear, substituted or unsubstituted, including xylene, toluene, naphthalene, and the like, the substituent or substituents on said aromatic hydrocarbon being selected from the group consisting of lower alkyl ($C_1$–$C_4$) and lower alkoxy ($C_1$–$C_4$) radicals, and mixtures thereof; (c) in the presence of an organometallic compound of the formula $$Y-Mg-Z$$

wherein Y is a member selected from the group consisting of halogen, including Cl, Br, and I, and substituted or unsubstituted, mononuclear or polynuclear, aryl radicals, and Z is a substituted or unsubstituted, mononuclear or polynuclear, aryl radical; and (d) recovering the resulting alkylated aromatic.

A typical embodiment of the instant discovery may be represented by the following equation:

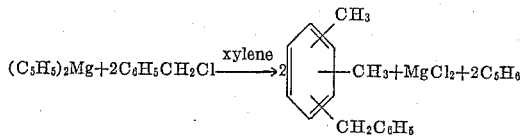

It would appear that the aralkyl halide reacts with xylene, by the liberation of a hydrogen atom, to form the aralkyl-substituted aromatic, while the organo-moiety of the organomagnesium compound combines with the thus-liberated hydrogen atom.

In view of what is known in the art using an ether solvent, a reaction according to the following equation would be expected, even in the absence of ether, i.e., in a substantially non-ethereal medium or under substantially non-ethereal conditions:

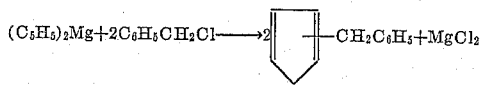

Pursuant to the instant discovery, therefore, an unexpected, unprecedented and straightforward method for alkylating aromatic hydrocarbons is provided. This is indeed a contribution to the art.

While compounds of the general character contemplated herein have heretofore been prepared, for example, by Friedel-Crafts benzylation of aromatic hydrocarbons, such as toluene, it was not known that organomagnesium compounds would catalyze the benzylation of aromatic hydrocarbons. As clearly indicated above, this latter reaction is not only unique but it is completely unexpected.

It is interesting to note that in a normal Friedel-Crafts benzylation of toluene, using very short reaction times, the initially formed products are the ortho- and para-benzyltoluenes and that these products readily isomerize to the meta- isomer. In addition, polybenzylation is very common in this type of reaction. Pursuant to the present invention, however, as will be seen hereinafter, substantially no meta- isomer is detected in the products and substantially no polybenzylation occurs.

Among the many substituted and unsubstituted alkyl halides contemplated herein are those which may be represented by the general formula $$RCH_2X$$

wherein R is a substituted or unsubstituted, mononuclear or polynuclear aromatic hydrocarbon radical, including phenyl, tolyl, xylyl, naphthyl, anthracyl, halobenzyl, such as chlorobenzyl, alkoxybenzyl, such as methoxy- and ethoxybenzyl. Other similar halo-, lower alkyl- and lower alkoxy-substituted aromatic hydrocarbon radicals are contemplated as well.

In addition, R may be an alkyl radical which in conjunction with the —$CH_2X$ group provides, so to speak, a relatively weak, relatively-easily ionized, readily hydrolyzed, or relatively polar carbon-halogen bond. Typical alkyl halides providing this property are tertiary-butyl, allyl, methallyl, and the like. Other halides within the purview of the instant discovery are the tertiary-alkyl halides, such as tertiary-amyl halide, 3-methyl-3-halo-hexane, 1,4-dihalo-4-methyl-hexane, 1-methoxy-3-halo-3-methylbutane, 1-halo-3-methyl-butene-2, cinnamyl chloride, cumenyl chloride, and the like.

Included among the substituted and unsubstituted aromatic hydrocarbons particularly suited for the present invention are xylene, toluene, naphthalene, anthracene, methyl-substituted naphthalene, anisole, propylbenzene, butoxytoluene, and the like. As will be seen hereinafter, since naphthalene and anthracene are solids they are conveniently admixed with the halide reactant in the presence of an in inert medium, such as chlorobenzene, to enhance the reaction by providing intimate contact between the aromatic hydrocarbon, the relatively polar halide and the organometallic catalyst. Naphthalene dissolves in chlorobenzene while anthracene is merely suspended therein.

Among the organomagnesium compounds suitable for the present invention and conforming to the formula Y—Mg—Z, above, are bis(cyclopentadienyl)magnesium, bis(methyl-substituted cyclopentadienyl)magnesium, phenylmagnesium bromide or chloride, tolylmagnesium bromide or chloride, xylylmagnesium bromide or chloride, naphthylmagnesium bromide or chloride, lower alkyl-substituted ($C_1$–$C_4$) naphthylmagnesium halide, and the like.

Although temperatures in the range of 0° C. to 85° C. are contemplated herein, best results are obtained at a temperature in the range of 15° C. to 50° C. Furthermore, the process of the present invention may be batch, semi-continuous or continuous, and may be brought about at atmospheric, sub-atmospheric, or super-atmospheric pressures.

It is also within the purview of the instant discovery to admix the reactants in various ways. Preferably, however, a solution of the alkyl or aralkyl halide component, or a solution containing both, in the aromatic hydrocarbon component is provided and the solution thoroughly admixed with a solution of the organometallic catalyst in more of the same aromatic hydrocarbon reactant component. In this way, adequate intermingling is provided.

Of course, as indicated above, this sequence may be varied considerably without affecting the reaction. For example, predetermined quantities of the catalyst and alkyl or aralkyl halide reactant may be introduced as separate or combined streams into a body of the aromatic hydrocarbon reactant, such as xylene, preferably while agitating the ensuing mixture.

The reactant:catalyst:reactant ratios contemplated herein may be varied significantly with satisfactory results. Stoichiometric quantities of the components of the reaction produce very desirable results. On the other hand, substantial excesses over stoichiometric may be employed without affecting the yield. For convenience, an excess of the aromatic hydrocarbon component, such as xylene, is generally used to provide a solvent, but an inert solvent, such as chlorobenzene, may be employed in lieu of or in conjunction with the hydrocarbon solvent, as shown hereinafter.

The following examples are illustrative only and, for the most part, the limitations contained are not intended to limit the scope of the invention; furthermore, unless otherwise indicated, parts by weight are intended in these examples.

EXAMPLE I

*Benzylxylene*

To 250 milliliters of an 0.613 molar xylene solution of bis(cyclopentadienyl)magnesium (0.15 mole) is added 34.6 milliliters (0.3 mole) of benzyl chloride in 50 milliliters of xylene. Since the reaction is exothermic, addition is made at a rate over a period of 85 minutes to provide a temperature in the range of about 30° C. to 40° C. The reaction mixture is stirred for an additional 90 minutes and then hydrolyzed. Benzylxylene is isolated by distillation in 44 percent yield (25.9 grams), boiling point 123° C.–125° C., at 1 millimeter (Hg) pressure.

The bis(cyclopentadienyl)magnesium compound in xylene, referred to above, is prepared as disclosed in U.S. Patent No. 2,788,377.

The remaining Y—Mg—Z compounds used in Examples II through X are prepared in ether and then an equal volume of the aromatic hydrocarbon component, e.g. xylene, toluene, or the like, is added thereto and the ether removed by distillation. In Examples XI and XII, however, the Y—Mg—Z compound in ether is diluted with chlorobenzene and the resulting solution distilled to remove ether.

EXAMPLE II

*Benzylxylene*

To 0.3 mole of phenylmagnesium bromide in xylene is added 30.6 milliliters (0.3 mole) of benzyl chloride in 50 milliliters of xylene. Since the reaction is exothermic, addition is made at a rate over a period of 75 minutes to provide a temperature in the range of about 35° C. to 40° C. The reaction mixture is stirred for an additional hour and then hydrolyzed. Benzylxylene is isolated by distillation in 81 percent yield (47.8 grams), boiling point 123° C.–125° C., at 1 millimeter (Hg) pressure.

EXAMPLE III

*Allylxylene*

To 0.4 mole of phenylmagnesium bromide in xylene is added over a period of 45 minutes 34.8 milliliters (0.4 mole) of allyl chloride in 35 milliliters of xylene. After stirring for an additional period of 18 hours the resulting reaction mixture is hydrolyzed and on distillation gives 19.3 percent yield (11.2 grams) of allylxylene, boiling point 76° C. to 78° C. at 10 millimeters (Hg) pressure and 12.6 percent (12.7 grams) of dixylylpropane, boiling point 145° C. to 148° C. at 2 millimeters (Hg) pressure.

EXAMPLE IV

*Tertiary-butylxylene*

To 0.2 mole of phenylmagnesium bromide in xylene is added 21.9 milliliters (0.2 mole) of tertiary-butyl chloride in 28 milliliters of xylene. The addition takes place over a period of 75 minutes at a rate to provide a temperature in the range of 34° C. and 41° C. After complete addition of the halide the reaction mixture is stirred for an additional 90 minutes and then hydrolyzed. On distillation a 61.4 percent yield of tertiary-butylxylene, boiling point 112° C. to 114° C. at 28 millimeters (Hg) mercury, is produced.

EXAMPLE V

*Allylxylene*

To 0.2 mole of phenylmagnesium bromide in xylene is added over a period of 45 minutes, while maintaining the temperature in the range of 30° C.–40° C., 17.3 milliliters (0.2 mole) of allyl bromide in 35 milliliters of xylene. After stirring the resulting reaction mixture for a period of 18 hours, the mixture is hydrolyzed and on distillation yields 26.6 percent allylxylene (7.8 grams), boiling point 76° C.–78° C. at 10 millimeters (Hg) pressure, and 15.5 percent dixylylpropane (7.8 grams), boiling point 145° C.–148° C. at 2 millimeters (Hg) pressure.

EXAMPLES VI THROUGH VIII

TABLE I

| Example | Ratio of $C_6H_5MgBr$: $C_6H_5CH_2X$ (equivalents) | X | Stirring [1] Time (hours) | Benzyltoluene | | |
|---|---|---|---|---|---|---|
| | | | | para- | meta- | ortho- |
| VI | 1:1 | Br | 1 | 15 | n.d. | 3 |
| VII | 1:2 | Br | 3 | 20 | n.d. | 3 |
| VIII | 1:2 | Cl | 3 | 40 | n.d. | 11 |

[1] Subsequent to addition of reactants.
N.d. = none detected.

Table I shows the isomer distribution in terms of the percent of the theoretical yield based on the limiting reactant. From this table it can be seen that in the presence of phenylmagnesium bromide, for example, no isomerization to the meta-isomer occurs. Furthermore, substantially no polybenzylation occurs.

All of the benzylation reactions of Table I, above, are on a scale of 0.1 mole of phenylmagnesium bromide at about 1 molar initial concentration. A solution of benzyl chloride or bromide, as indicated, in an equal volume of toluene is added slowly to phenylmagnesium bromide in toluene over a period of 10 to 20 minutes. The ratio of addition is controlled to keep the reaction temperature between 35° C. to 40° C. After complete addition of the halide, the reaction mixture is stirred for the additional period of time shown in Table I. Subsequently, the reaction mixture is hydrolyzed in each case, distilled and analyzed by infrared spectroscopy to determine isomer distribution.

EXAMPLE IX

*Xylylxylene*

To 0.3 mole of naphthylmagnesium chloride in xylene is added 42.4 grams (0.3 mole) of p-xylyl chloride in 50 milliliters of xylene. The addition requires 90 minutes in order to keep the temperature between 35° C.–40° C. The resulting mixture is stirred an additional hour and then hydrolyzed. p-Xylylxylene is then isolated in substantial yield by distillation.

EXAMPLE X

*Naphthylmethyl Xylene*

To 0.3 mole of phenylmagnesium bromide in xylene is added 52.9 grams (0.3 mole) of α-naphthylmethyl chloride in 50 milliliters of xylene. The addition requires 75 minutes in order to keep the temperature between 35° C.–40° C. The resulting mixture is stirred an additional hour and then hydrolyzed. α-Naphthylmethyl xylene is then isolated in substantial yield by distillation.

EXAMPLE XI

*Benzylnaphthalene*

To 0.2 mole of phenylmagnesium bromide in chlorobenzene is added 25.6 grams (0.2 mole) of naphthalene in 50 milliliters of chlorobenzene. To the resulting mixture is added 23.0 milliliters (0.2 mole) of benzyl chloride in 25 milliliters of chlorobenzene in 105 minutes, the temperature being kept between 35° C.–40° C. by controlled addition. The resulting mixture is then stirred for an additional 2 hours and then hydrolyzed. α-Benzylnaphthalene is isolated by distillation in better than 50 percent yield.

EXAMPLE XII

*Benzylanisole*

To 0.3 mole of para-tolymagnesium chloride in chlorobenzene is added 32.4 grams (0.3 mole) of anisole in 50 milliliters of chlorobenzene. To the resulting mixture is added 34.5 milliliters (0.3 mole) of benzyl chloride in 35 milliliters of chlorobenzene. The addition requires 95 minutes in order to keep the temperature between 35° C.–40° C. The resulting mixture is stirred an additional hour and then hydrolyzed. Benzylanisole is then isolated in substantial yield by distillation.

Clearly, the instant discovery encompasses numerous modifications within the skill of the art. Furthermore, while the present invention has been described in detail with respect to specific embodiments thereof, it is not intended that these details be construed as limitations upon the scope of the invention, except insofar as they appear in the appended claims.

I claim:

1. A method of ring alkylating aromatic compounds which consists essentially in bringing together into intimate contact at a rate to maintain reaction temperatures in the range of 0° C. to 85° C.: (a) an organic halide selected from the group consisting of $RCH_2X$, wherein R is a member selected from the group consisting of phenyl, naphthyl and anthracyl, and substituted phenyl, naphthyl and anthracyl, the substituents for said substituted phenyl, naphthyl and anthracyl being selected from the group consisting of halogen, lower alkyl and lower alkoxy, and X is a member selected from the group consisting of bromine and chlorine; a tertiary alkyl halide having only lower alkyl and substituted lower alkyl moieties on its tertiary carbon atom, the substituents for said lower alkyl moieties being selected from the group consisting of halogen and lower alkoxy; and an allyl monohalide and a substituted allyl monohalide in which the allyl moiety is substituted with a member selected from the group consisting of lower alkyl and phenyl; and (b) an aromatic compound selected from the group consisting of naphthalene, substituted naphthalene, anthracene, substituted anthracene and substituted benzene, said substituents being selected from the group consisting of lower alkyl and lower alkoxy, there being no more than two of said substituents on any of said aromatic moieties; (c) in the presence of an organometallic compound selected from the group consisting of bis(cyclopentadienyl)magnesium, bis(lower alkyl substituted cyclopentadienyl)magnesium, and a compound of the formula Y—Mg—Z, wherein Y is a member selected from the group consisting of bromine, chlorine and iodine, and Z is a member selected from the group consisting of phenyl, lower alkyl-substituted phenyl, naphthyl and lower alkyl-substituted naphthyl; (d) hydrolyzing the resulting reaction mixture; and (e) recovering the resulting ring alkylated aromatic product which is said aromatic compound (b), above containing on its ring the moiety remaining upon dehalogenation of the organic halide (a), above.

2. A process according to claim 1 wherein the aromatic hydrocarbon is xylene.

3. A process according to claim 1 wherein the aromatic hydrocarbon is toluene.

4. A process according to claim 1 wherein the aromatic hydrocarbon is naphthalene.

5. A process according to claim 1 wherein the aromatic hydrocarbon is anisole.

6. A process according to claim 1 wherein the reaction is carried out at a temperature in the range of 15° C. to 50° C.

References Cited in the file of this patent

UNITED STATES PATENTS

| | | |
|---|---|---|
| 2,170,989 | Coleman et al. | Aug. 29, 1939 |
| 2,506,551 | Sachanen et al. | May 2, 1950 |

OTHER REFERENCES

Schoepfle et al.: Jour. Amer. Chem. Soc., vol. 58 (1936), 791–794.

Kharasch et al.: Jour. Amer. Chem. Soc., vol. 60 (1938), 2004 (1 page).

Vavon et al.: Chem. Abstracts, vol. 40 (1945), 2135 (1 page).